(12) United States Patent
Hongo et al.

(10) Patent No.: US 9,893,331 B2
(45) Date of Patent: Feb. 13, 2018

(54) BATTERY ADHESION-FIXATION STRUCTURE

(71) Applicant: TOYODA GOSEI CO., LTD., Kiyosu-shi, Aichi-ken (JP)

(72) Inventors: Hiroaki Hongo, Kiyosu (JP); Yoshiki Nakamura, Kiyosu (JP); Kosuke Kusaba, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 69 days.

(21) Appl. No.: 14/884,909

(22) Filed: Oct. 16, 2015

(65) Prior Publication Data
US 2016/0118633 A1   Apr. 28, 2016

(30) Foreign Application Priority Data
Oct. 28, 2014  (JP) .................. 2014-219353

(51) Int. Cl.
*H01M 2/10* (2006.01)
*H01M 2/20* (2006.01)

(52) U.S. Cl.
CPC ......... *H01M 2/105* (2013.01); *H01M 2/1077* (2013.01); *H01M 2/204* (2013.01); *H01M 2/206* (2013.01)

(58) Field of Classification Search
CPC .... H01M 2/105; H01M 2/1077; H01M 2/206; H01M 2/204
USPC ....................................... 429/121
See application file for complete search history.

(56) References Cited

U.S. PATENT DOCUMENTS

| 6,495,278 | B1 * | 12/2002 | Schmid | .................. | C25B 9/10 |
| | | | | | 429/465 |
| 2008/0003495 | A1 * | 1/2008 | Shimizu | .............. | H01M 2/1077 |
| | | | | | 429/99 |
| 2011/0293998 | A1 * | 12/2011 | Sato | ................... | H01M 2/1077 |
| | | | | | 429/159 |

FOREIGN PATENT DOCUMENTS

| CN | 102263214 A | 11/2011 |
| JP | 2013-008655 A | 1/2013 |

OTHER PUBLICATIONS

Office Action dated Jul. 28, 2017 issued in corresponding CN patent application No. 201510712839.2 (and English machine translation).

* cited by examiner

*Primary Examiner* — Jonathan Jelsma
*Assistant Examiner* — Omar Kekia
(74) *Attorney, Agent, or Firm* — Posz Law Group, PLC

(57) ABSTRACT

A battery adhesion-fixation structure includes battery cells, a holder, an adhesive agent, bus bars, and an insulator. The holder includes holder holes for holding the battery cells therein. The adhesive agent adheres the battery cells with the holder within the holder holes. The bus bars electrically connect the battery cells with each other. The insulator intervenes between the bus bars and the holder. The bus bars include a bus-bar hole, and a terminal tab. The bus-bar hole faces face-to-face to an electrode terminal of the battery cells. The terminal tab projects into the bus-bar hole to be electrically connected with the electrode terminal. The insulator includes a face, and a dent opening in the face. The face opposes to the holder. The dent opens in the face, and accommodates the adhesive agent overflown toward the insulator therein.

10 Claims, 9 Drawing Sheets

2

BATTERY ADHESION-FIXATION STRUCTURE

INCORPORATION BY REFERENCE

The present invention is based on Japanese Patent Application No. 2014-219353, filed on Oct. 28, 2014, the entire contents of which are incorporated herein by reference.

BACKGROUND OF THE INVENTION

Field of the Invention

The present invention relates to a battery adhesion-fixation structure for fixing multiple batteries, cells or battery cells onto a holder via an adhesive agent.

Description of the Related Art

A holder used for battery adhesion-fixation structure has been usually provided with multiple holder holes. For example, as disclosed in Japanese Unexamined Patent Publication (KOKAI) Gazette No. 2013-8655, a battery cell is inserted into each of the holder holes, and is adhered or bonded with the holder via an adhesive agent onto an inner peripheral face of the holder holes. Moreover, an electrode terminal located at one of the opposite ends of the battery cells is exposed at one of the axial opposite ends of the holder holes. In addition, a bus bar connects electrically between the electrode terminals exposed at the one of the axial opposite ends of the holder holes.

As illustrated in FIG. 13, Japanese Unexamined Patent Publication (KOKAI) Gazette No. 2013-8655 discloses a fixing method for fixing a battery cell 101 with a holder 102 via an adhesive agent 103 within a holder hole in the holder 102. In the fixing method, such a fear might possibly arise as the adhesive agent 103 has overflown even up to a joining part between a bus bar 104 and an electrode terminal 114 of the battery cell 101, as shown in FIG. 13, upon inserting the battery cell 101 into a holder hole in the holder 102. Note herein that the adhesive agent 103 is usually nonconductive. Consequently, when the adhesive agent 103 intervenes between the electrode terminal 114 and a terminal tab 142, a joining element, faulty joint as well as faulty electric connection might possibly occur between the electrode terminal 114 and the terminal tab 142.

SUMMARY OF THE INVENTION

In view of the aforementioned circumstances, it is therefore an object of the present invention to reduce the amount of an adhesive agent overflowing up to the vicinity of an electrode terminal of a battery, cell or battery cell upon fixing the battery, cell or battery cell onto a holder by adhesion, thereby upgrading the joining property between the electrode terminal and a terminal tab.

In order to achieve the aforementioned object, a battery adhesion-fixation structure according to the present invention comprises:

a plurality of battery cells;
a holder including a plurality of holder holes for holding the battery cells therein;
an adhesive agent adhering the battery cells with the holder within the holder holes;
a plurality of bus bars electrically connecting the battery cells with each other;
an insulator intervening between the bus bars and the holder;
the bus bars including a bus-bar hole facing to an electrode terminal of the battery cells, and a terminal tab projecting into the bus-bar hole, the terminal tab to be electrically connected with the electrode terminal;
the insulator including a face opposing to the holder, and a dent opening in the face; and
the dent accommodating the adhesive agent overflown toward the insulator therein.

In the present invention, the insulator includes a face opposing to the holder, and a dent opening in the face. The dent can accommodate the adhesive agent being potentially capable of overflowing toward the electrode terminal of the battery cells as the battery cells are inserted into the holder holes. Therefore, the dent can inhibit the adhesive agent from reaching the joining part between the electrode terminal and the terminal tab of the bus bar.

Moreover, it is desirable that the insulator can further include a sub-dent disposed more adjacently to a side of the electrode terminal of the battery cells than is the dent disposed, and opened toward one of the holder holes, and that the sub-dent can communicate with the dent.

The thus constructed insulator includes the sub-dent, which communicates with the dent, on a side that is more adjacent to a side of the electrode terminal of the battery cells than is the dent. The sub-dent also accommodates the adhesive agent, which has overflow toward the electrode-terminal side, in the same manner as the dent does. Moreover, the sub-dent can accommodate the adhesive agent, which has moved further toward aside of the electrode terminal beyond the dent, because it is present on a side much closer to the electrode-terminal side than is the dent. In addition, further providing the insulator with the sub-dent in addition to the dent results in increasing an accommodation volume being capable of holding or accommodating the overflown adhesive agent therein. Thus, the dent and subdent, which operate cooperatively, make it possible to more reliably inhibit the adhesive agent from reaching the joining part between the electrode terminal of the battery cells and the terminal tab of the bus bars.

Moreover, it is desirable that the bus bars, and the insulator can be integrated to make up a bus-bar module. In addition, it is more desirable that the bus-bar module can include a through bore leading to and from the dent.

The thus constructed bus-bar module can discharge air, which resides within the dent, through the through bore, when the adhesive agent has closed or clogged an opening of the dent on a side of the holder. Therefore, the bus-bar module enables the adhesive agent to completely fill up within the dent. Moreover, the through bore can guide or direct the adhesive agent, which is held or accommodated in the dent, to the outside of the bus-bar module. Hence, the bus-bar module makes it possible to more effectively inhibit the adhesive agent from reaching the joining part between the electrode terminal of the battery cells and the terminal tab of the bus bars. In addition, the adhesive agent, which comes to exist outside the bus-bar module through the through bore after it has been cured, performs a role of anchor. That is, not only the adhesive agent fixes the battery cells onto the holder holes in the holder, but also the bus-bar module makes it feasible to fasten the battery cells in place via the adhesive agent. Moreover, the anchoring effect makes it possible to more reliably fix the bus-bar module onto the holder. Therefore, it is possible to more firmly fasten the battery cells with the holder and bus-bar module by way of the adhesive agent.

As described above, the battery adhesion-fixation structure according to the present invention makes it possible to reduce an amount of the adhesive agent overflowing up to and around the electrode terminal of the battery cells, and thereby enables the electrode terminal and the terminal tab of the bus bars to be joined one another with upgraded joining property.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
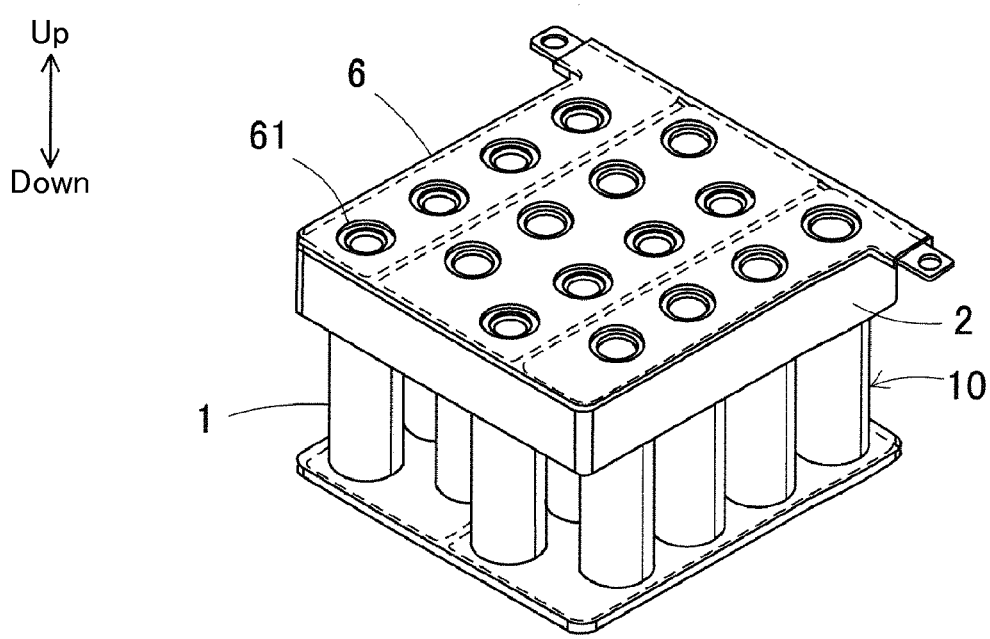
FIG. 1 illustrates a perspective view of a battery module employing a battery adhesion-fixation structure according to the present invention.

Having generally described the present invention, a further understanding can be obtained by reference to the specific preferred embodiments which are provided herein for the purpose of illustration only and not intended to limit the scope of the appended claims.

Some of suitable battery adhesion-fixation structures according to the present invention will be hereinafter described with reference to FIGS. 1 through 12. In the drawings, members identical with each other are labeled with an identical reference numeral, respectively, and duplicating descriptions thereon will be abbreviated. Moreover, in the drawings, the "up/down" direction refers to a direction parallel to the direction of arranging battery cells, and more specifically to a direction parallel to the axial direction of the battery cells. Note that the present invention is not restricted at all to the embodiment modes according to the present invention because the embodiment modes are recited as especially useful modes for executing the present invention. In addition, matters other than those particularly referred to in the present specification but needed for carrying out the present invention can be grasped as designing matters that a person having ordinary skill in the art could think of based on the related art. That is, the present invention can be executed based on accounts disclosed in the present specification and common technical knowledge in the field.

First Embodiment

Figure 2:
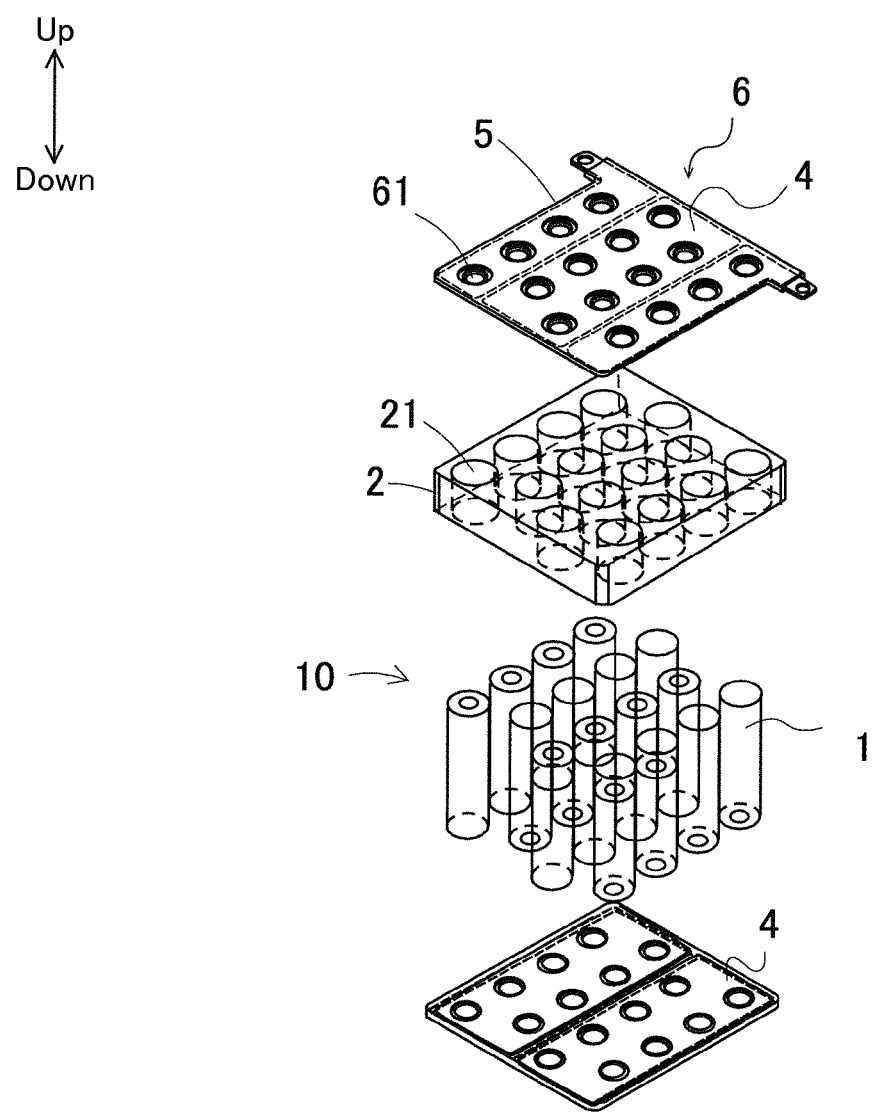
FIG. 2 illustrates an exploded perspective view of the battery module employing the present battery adhesion-fixation structure.

As illustrated in FIGS. 1 and 2, a battery adhesion-fixation structure "A" directed to First Embodiment according to the present invention comprises a plurality of battery cells 1, a holder 2, an adhesive agent 3, a plurality of bus bars 4, and an insulator 5. The holder 2 includes a plurality of holder holes 21. The adhesive agent 3 adheres or bonds the battery cells 1 with the holder 2. The insulator 5 intervenes between the bus bars 4 and the holder 2.

The battery cells 1 are a cylindrical battery, respectively. Each of the cylindrical batteries includes positive- and negative-electrode faces (11, 11) at the opposite ends in the axial direction, respectively. The positive-electrode face 11 is provided with a positive-electrode terminal, and the negative-electrode face 11 is provided with a negative-electrode terminal. The multiple battery cells 1 are arranged so as to make the axial directions parallel to each other, and thereby make up a battery assembly 10.

The holder 2 is a plate-shaped body made of a metallic material, such as aluminum, copper or iron, for instance. The holder 2 holds the multiple battery cells 11 of the battery assembly 10 in the holder holes 21. Moreover, the holder 2 made of a metallic material performs a role of a heatsink or radiator plate for radiating heats that the battery cells 1 held therein generate. The holder 2 includes a top face 23, one of the two opposite faces, which faces face-to-face to the insulator 5 described later. As illustrated in FIGS. 1 and 2, First Embodiment comprises the holder 2 disposed at one of the opposite ends of the battery cells 1 in the axial direction. To be concrete, the holder 2 is disposed at the top end of the battery cells 1 to hold the battery cells 1 therein.

Figure 3:
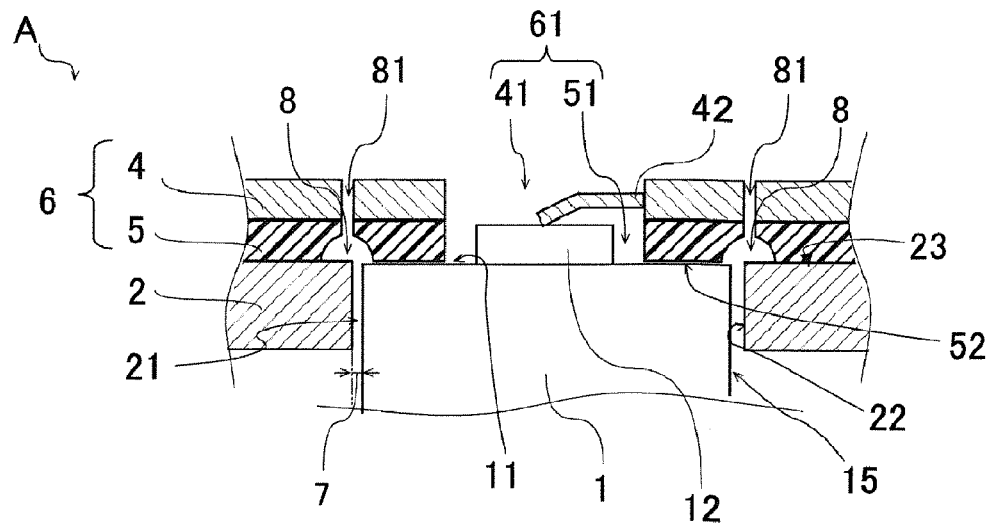
FIG. 3 is an explanatory diagram for schematically illustrating a cross section in a battery adhesion-fixation structure "A" directed to First Embodiment according to the present invention, and shows a condition where it is free of any adhesive agent.
Figure 4:
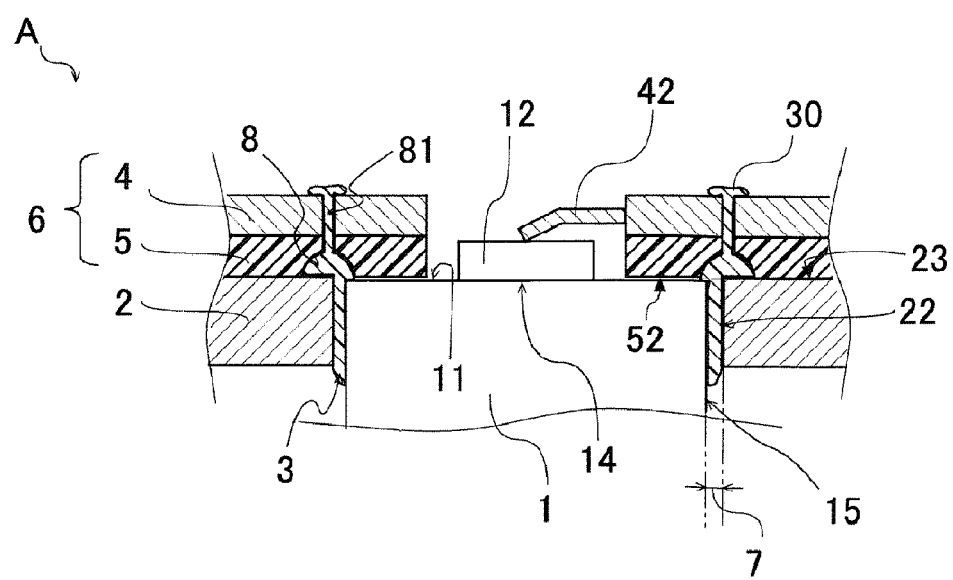
FIG. 4 is another explanatory diagram for schematically illustrating the cross section in the present battery adhesion-fixation structure "A" directed to First Embodiment.

As illustrated in FIGS. 3 and 4, the holder holes 21 are a through hole, respectively, and have a hole diameter that is slightly larger than a diameter of the battery cells 1. Each of the battery cells 1, which make up the battery assembly 10, is inserted into the respective holder holes 21. Moreover, the adhesive agent 3 is interposed between a holder-hole inner peripheral face 22 of the holder holes 21 and a battery outer peripheral face 15 of the battery cells 1, as shown in FIG. 4.

As illustrated in FIG. 4, the adhesive agent 3 bonds the battery outer peripheral face 15 of the battery cells 1 with the holder-hole inner peripheral face 22 of the holder holes 21 to fix them within the holder holes 21. To be concrete, the following can be named as the adhesive agent 3: reactive adhesive agents; solvent adhesive agents; emulsion adhesive agents; hot-melt adhesive agents; and synthetic-rubber adhesive agents.

The bus bars 4 connect electrically between the electrode terminals of the battery cells 1 within the battery assembly 10. The bus bars 4 make a thin plate formed of a conductive metal. As a conductive metal used for making the bus bars 4, copper, aluminum, or iron can be named, for instance.

As illustrated in FIG. 3, the bus bars 4 form multiple numbers of bus-bar holes 41 for exposing an electrode terminal 12 of the battery cells 1, respectively. The bus-bar holes 41 are disposed at positions that correspond to the electrode terminals 12. Moreover, the bus-bar holes 41 are formed in a quantity that conforms to a quantity of the electrode terminals 12. In addition, a terminal tab 42 projects from out of an inner rim of the bus-bar holes 41 to exist in the bus-bar holes 41, respectively. The terminal bar 42 is connected electrically with the electrode terminal 12 of the battery cells 1 by welding, for instance.

The insulator 5 intervenes between the bus bars 4 and the holder 2. The insulator 5 is a thin plate made of an insulating substance, such as a resinous material, for instance.

As illustrated in FIG. 3, the insulator 5 includes insulator holes 51 communicating with the bus-bar holes 41. Note herein that a hole diameter of the bus-bar holes 41 and insulator holes 51 is smaller than a hole diameter of the holder holes 21. Besides, a diameter of the battery cells 1 is slightly smaller in size than a hole diameter of the holder holes 21, but is larger than the hole diameter of the bus-bar holes 41 and insulator holes 51. Moreover, the bus-bar holes 41, the insulator holes 51, and the holder holes 21 are disposed coaxially. In addition, the insulator 5 further includes a holder-opposing face 52 opposing to the holder 2.

As illustrated in FIGS. 3 and 4, First Embodiment comprises the bus bars 4 and insulator 5 that are formed integrally to make up a bus-bar module 6. The bus-bar module 6 is formed as a laminated structure including the insulator 5 that is located on a side of the holder 2, and the bus bars 4 that are laminated on the insulator 5. Moreover, as illustrated in FIG. 3, the bus-bar module 6 further includes bus-bar-module holes 61 made up of the bus-bar holes 41 and insulator holes 51 that communicate with each other. In addition, the terminal tab 42, which projects from out of an inner rim of the bus-bar holes 41, exists inside the resulting bus-bar-module holes 61, respectively.

As illustrated in FIG. 3, the bus-bar module 6 further includes a groove-shaped dents or recesses 8. The recesses 8 have an opening in the holder-opposing face 52 of the insulator 5, respectively. The recesses 8 are set up in a circumferential rim of the bus-bar-module holes 61 so as to open not only toward the top face 23 of the holder 2, one of the opposite faces thereof, but also toward the holder holes 21 in the top face 23. When the recesses 8 are viewed from a side of the holder-opposing face 52 of the insulator 5, the opening has a configuration formed as a ring shape. As illustrated in FIGS. 3 and 4, the recesses 8 have a cross-sectional configuration formed as a semicircular shape. Note that the cross-sectional configuration of the recesses 8 is not at all restricted especially to such a semicircular shape.

As illustrated in FIGS. 3 and 4, the bus-bar module 6 further includes a through bore 81 in a quantity of multiple pieces. The through bores 81 lead to and from the recesses 8, respectively. That is, the through bores 81 connect or link the interior of the recesses 8 with the outside of the bus-bar module 6, respectively.

Figure 5:
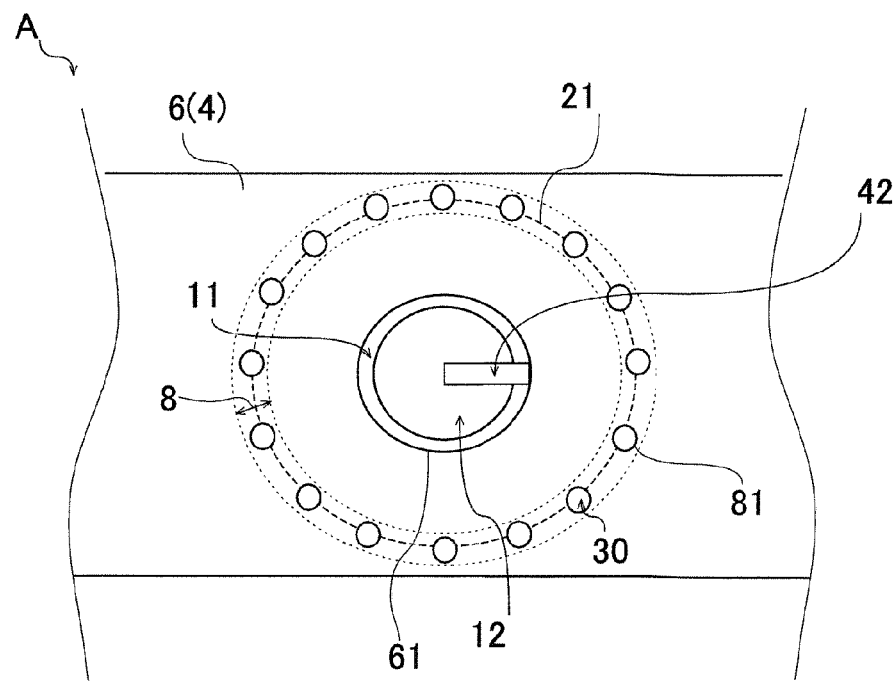
FIG. 5 illustrates a plan view of the present battery adhesion-fixation structure "A" directed to First Embodiment.

As illustrated in FIG. 5, First Embodiment comprises the through bores 81 that are set up at equal intervals in a circumferential direction along the configuration of the ring-shaped recess 8. Note that the configuration and quantity of the through bores 81 are not at all restricted especially to those illustrated in the drawing.

As illustrated in FIGS. 3 and 4, a clearance 7 is formed between the holder-hole inner peripheral face 22 and the battery outer peripheral face 15. Upon inserting the battery cell 1 into the holder hole 21, the recess 8 and through hole 81 accommodate the adhesive agent 3 therein when the adhesive agent 3 has overflown from out of the clearance 7 to the top face 23 of the holder 2, one of the opposite faces of thereof.

Hereinafter, descriptions will be made on how the battery adhesion-fixation structure "A" directed to First Embodiment according to the present invention operates and/or functions while referring to FIGS. 3 through 5, and FIGS. 6A through 6C.

Figure 6A:
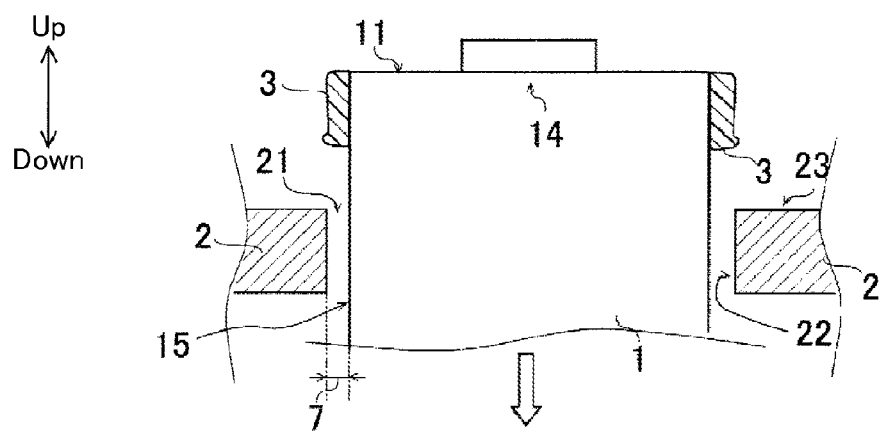
FIG. 6A is an explanatory diagram for schematically illustrating the cross section in the present battery adhesion-fixation structure "A" directed to First Embodiment, and shows a process of fixing a battery cell onto a holder by adhesion.
Figure 6B:
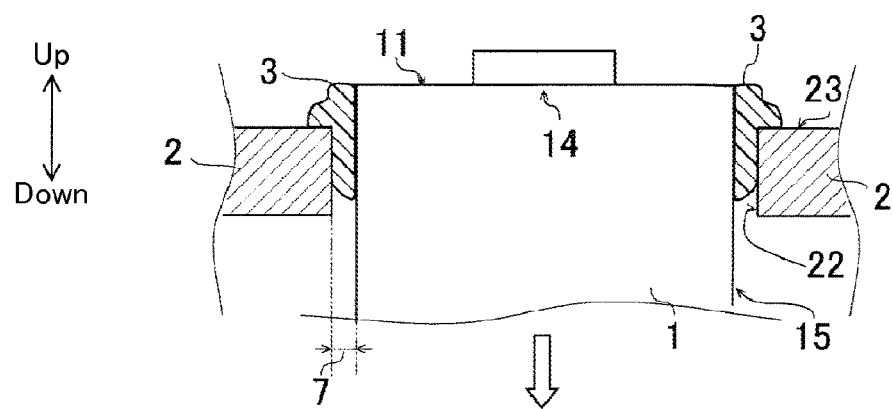
FIG. 6B is another explanatory diagram for schematically illustrating the cross section in the present battery adhesion-fixation structure "A" directed to First Embodiment according to the present invention, and shows another process of fixing the battery cell onto the holder by adhesion.
Figure 6C:
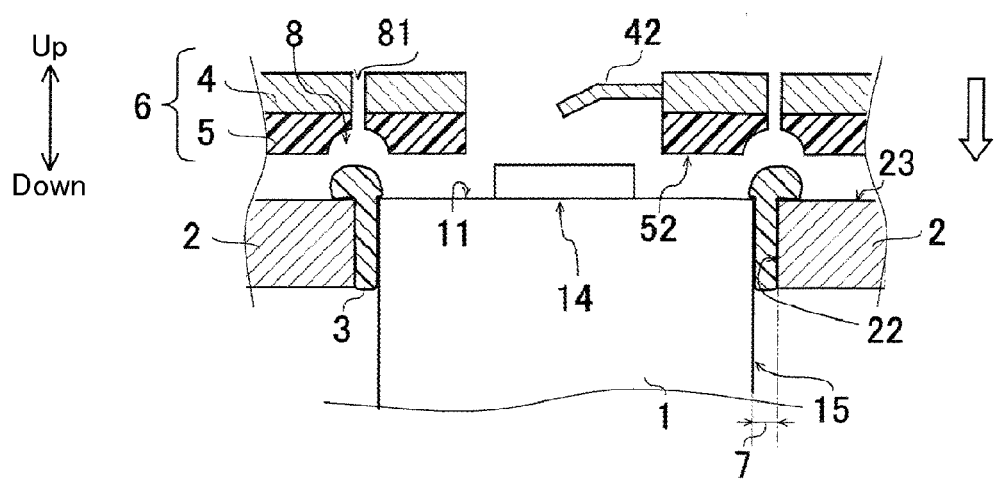
FIG. 6C is still another explanatory diagram for schematically illustrating the cross section in the present battery adhesion-fixation structure "A" directed to First Embodiment, and shows still another process of fastening a bus-bar module in place after the battery cell has been fixed onto the holder by adhesion.

FIGS. 6A through 6C illustrate processes in which the battery cell 1 is fixed to the holder hole 21, and then to the bus-bar module 6. First of all, the adhesive agent 3 is coated onto the battery outer peripheral face 15 of the battery cell 1. To be concrete, the adhesive agent 3 is coated onto the battery outer peripheral face 15 in the upper end of the battery cell 1 in the axial direction. The upper end of the battery cell 1 is located on a trailing side of the battery cell 1 in a battery insertion direction in which the battery cell 1 is inserted into the holder bore 21. That is, the battery cell 1 is inserted into the holder bore 21 while the axial lower end, onto which no adhesive agent 3 has been coated, works as a leading end in the battery insertion direction. The blank arrow shown in FIGS. 6A and 6B indicates the insertion direction of the battery cell 1.

The battery cell 1, which is fit into the holder hole 21 starting at the lower end thereof, is inserted into the holder hole 21 until the upper end thereof is situated inside the holder bore 21 and then the electrode face 11 and the top face 23 of the holder 2, one of the opposite faces thereof, become flush one another. When the upper end of the battery cell 1 is situated within the holder hole 21, the adhesive agent 3 is put in place at a position corresponding to the clearance 7. Note herein that, in order to fix the holder 2 with the battery cell 1 more securely, an employment amount of the adhesive agent 3 is set up to such an amount that is slightly more than needed actually. Consequently, some of the adhesive agent 3 overflows from out of the clearance 7 to the top face 23 of the holder 2 as the battery cell 1 goes into the holder bore 21, as shown in FIGS. 6B and 6C.

Then, the bus-bar module 6 is disposed onto the top face 23 of the holder 2 (i.e., one of the opposite faces thereof). The blank arrow shown in FIG. 6C indicates the disposition direction of the bus-bar module 6. The bus-bar module 6 is disposed so as to put the holder-opposing face 52 of the insulator 5 in place face-to-face to the top face 23 of the holder 2. Moreover, the holder hole 21, and the bus-bar-module hole 61 are disposed coaxially. In addition, the holder 2, and the bus-bar module 6 are fixed with each other to be unmovable relatively to each other, as shown in FIG. 4.

As illustrated in FIGS. 3 and 6C, First Embodiment comprises the recess 8 that is disposed in the holder-opposing face 52 of the insulator 5, and which opens toward the top face 23 of the holder 2 (i.e., one of the opposite ends thereof), and toward the holder hole 21 in the holder 2. In other words, the recess 8 is set up at a position that opposes to the top face 23 of the holder 2, and to the electrode face 11 of the battery cell 1. Therefore, the bus-bar module 6 is installed so as to make the recess 8, with which the insulator 5 is provided, cover the overflown adhesive agent 3 for some of which has overflown from out of the clearance 7 up to the top face 23 and electrode face 11.

Since the adhesive agent 3 exhibits a viscosity to some extent, the adhesive agent 3 overflown from out of the clearance 7 turns bulky. First Embodiment can accommodate the adhesive agent 3, which has turned bulky, in the recess 8. Therefore, the holder-opposing face 52 does not at all crush down the resulting bulky adhesive agent 3 to flatten or spread it out upon installing the bus-bar module 6 onto the holder 2. In other words, no flattening or spreading of the adhesive agent 3 occurs at all so that some of the overflown adhesive agent 3 hardly reaches the electrode terminal 12 located in a central area 14 of the electrode face 11. Hence, the battery adhesion-fixation structure "A" according First Embodiment relieves the fear of the adhesive agent 3 that might possibly arise to be present between the joining part between the electrode terminal 12 and the terminal tab 42 that projects into the bus-bar hole 41.

Thus, First Embodiment can reduce an amount of the adhesive agent 3, which overflows up to the vicinity of the electrode terminal 12. Accordingly, First Embodiment can inhibit faulty joining between the electrode terminal 12 and the terminal tab 42. Consequently, First Embodiment can materialize a battery adhesion-fixation structure that excels in the adhesive properties.

Moreover, as illustrated in FIGS. 3 and 4, First Embodiment comprises the bus-bar module 6 that is provided with the through bores 81 leading to and from the recesses 8. That is, First Embodiment can transfer the adhesive agent 3, which has gone into the recesses 8, to the outside of the bus-bar module 6 through the through bores 81. Accordingly, the recesses 8 including the through bores 81 can accommodate the adhesive agent 3 therein in a much larger amount. Consequently, the recesses 8 can reduce an amount of the adhesive agent 3 that might possibly overflow up to the vicinity of the electrode terminal 12. Additionally, the recesses 8 can more effectively inhibit the adhesive agent 3 from reaching the joining part between the electrode terminal 12 and the terminal tab 42. Therefore, the recesses 8 can inhibit the electrode terminal 12 and terminal tab 42 from being joined faultily in the central area 14 of the electrode face 11. Hence, the recesses 8 enable a battery adhesion-fixation structure excelling more in the adhesive properties to materialize.

Moreover, as illustrated in FIGS. 4 and 5, the adhesive agent 3, which has spread out from the recesses 8 up to the exterior of the bus-bar module 6 byway of the through bores 81, forms heads 30. The resultant heads 30 produce an anchoring effect. As a result, the heads 30 upgrade the fixation strength between the holder 2 and the battery cells 1 more effectively. In addition, the anchoring effect resulting from the heads 30 also upgrades the fixation strength between the bus-bar module 6 and the holder 2. Thus, First Embodiment can materialize a battery adhesion-fixation structure with much better adhesive properties.

Second Embodiment

A battery adhesion-fixation structure "B" directed to Second Embodiment according to the present invention differs from First Embodiment in that the bus-bar module 6 further includes sub-dents or minor recesses 9. Other than the bus-bar module 6, Second Embodiment is roughly identical with First Embodiment. Descriptions will be hereinafter made on the constituent element that is different from that in First Embodiment.

Figure 7:
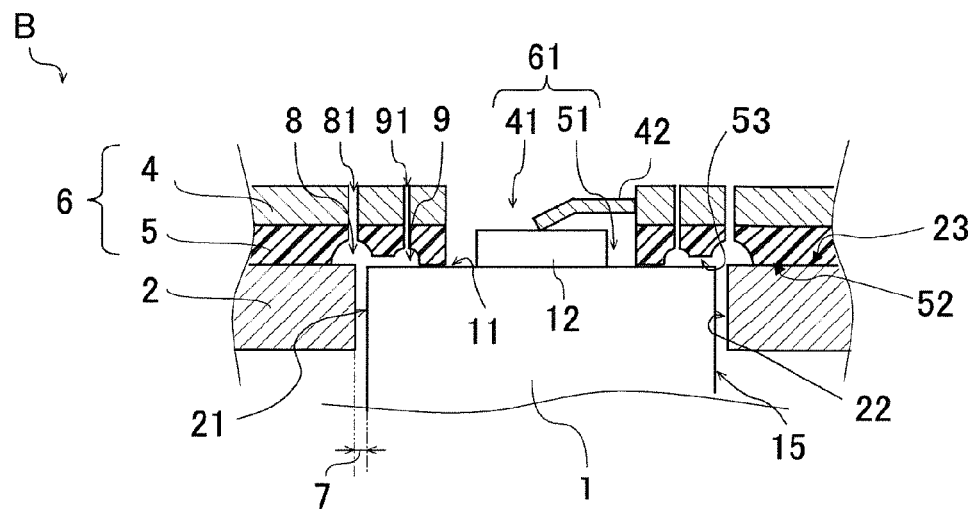
FIG. 7 is an explanatory diagram for schematically illustrating a cross section in a battery adhesion-fixation structure "B" directed to Second Embodiment according to the present invention, and shows a condition where it is free of any adhesive agent.
Figure 8:
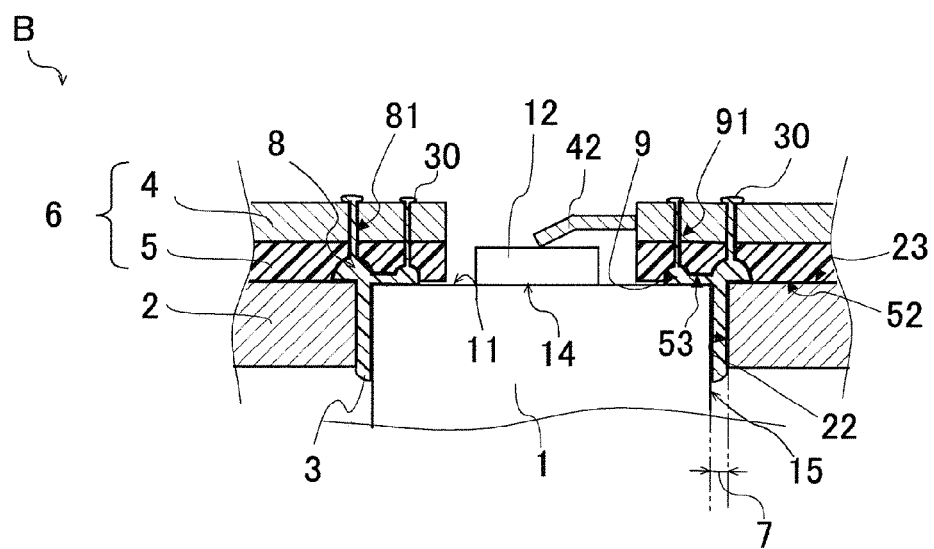
FIG. 8 is another explanatory diagram for schematically illustrating the cross section in the present battery adhesion-fixation structure "B" directed to Second Embodiment.
Figure 9:
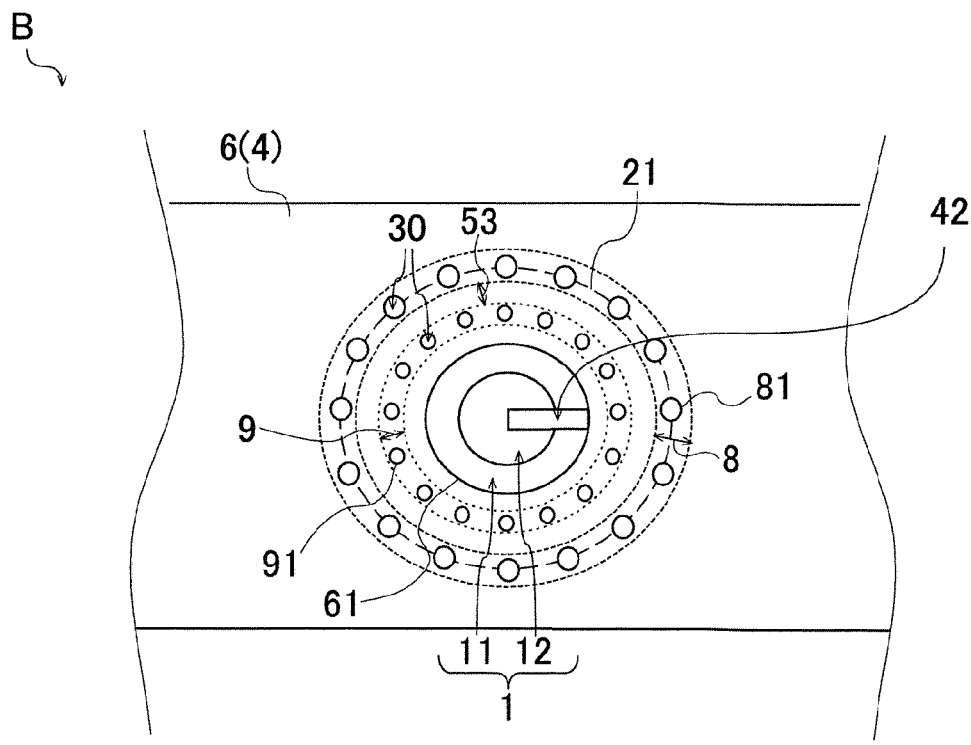
FIG. 9 illustrates a plan view of the present battery adhesion-fixation structure "B" directed to Second Embodiment.

As illustrated in FIGS. 7 through 9, the battery adhesion-fixation structure "B" directed to Second Embodiment comprises the bus-bar module 6 further including the minor recesses 9.

The minor recesses 9 are set up on a side, which is more adjacent to the electrode terminal 12 than are the recesses 8, in the circumferential rim of the bus-bar-module holes 61, as shown in FIGS. 7 through 9. The minor recesses 9 are formed as a groove shape having an opening in the holder-opposing face 52 of the insulator 5. The minor recesses 9 oppose to the holder holes 21 at the opening, respectively. Moreover, the opening of the minor recesses 9 is formed as ring shape in the configuration when it is viewed on a side of the holder-opposing face 52 of the insulator 5. In addition, the minor recesses 9 demarcate a smaller space than the space that the recesses 8 demarcate, respectively.

Moreover, the bus-bar module 6 further includes sub-through bores or minor through bores 91, which lead to and from the respective minor recesses 9, in a quantity of multiple pieces. That is, the spaces, which the minor recesses 9 demarcate in the insulator 5, lead to and from the outside of the bus-bar module 6 by way of the minor through bores 91 that penetrate through the insulator 5 and bus bars 4. As illustrated in FIG. 9, Second Embodiment comprises the minor through bores 91 that are setup at equal intervals in a circumferential direction along the configuration of the ring-shaped minor recess 9. Note that the configuration and quantity of the minor through bores 91 are not at all restricted especially to those illustrated in the drawings.

A communication passage 53 is set up between the recesses 8 and the minor recesses 9 to communicate their openings with each other. As illustrated in FIGS. 8 and 9, not only the minor recesses 9 and minor through bores 91 but also the recesses 8 and through bores 81 operate cooperatively to hold or accommodate the adhesive agent 3, which has come to overflow from out of the clearance 7 to the top face 23 of the holder 2 (i.e., one of the opposite faces thereof), therein.

Hereinafter, the battery adhesion-fixation structure "B" directed to Second Embodiment according to the present invention will be described on how it operates and/or functions.

In the battery adhesion-fixation structure "B" directed to Second Embodiment, the insertion method of the battery cells 1 into the holder holes 21 is identical with that in First Embodiment. That is, some of the adhesive agent 3 overflows likewise from out of the clearance 7 to the top face 23 of the holder 2 (i.e., one of the opposite faces thereof) as the battery cells 1 go into the holder hole 21.

Note herein that Second Embodiment comprises the recesses 8 and minor recesses 9 that are set up in the bus-bar module 6, as shown in FIGS. 7 through 9. The minor recesses 9 include an opening, respectively, in the same manner as the recesses 8. Moreover, the communication passage 53 communicates the opening of the minor recesses 9 with the opening of the recesses 8, respectively. In addition, the minor recesses 9 are set up on a side that is more adjacent to the electrode terminal 12 than are the recesses 8. Accordingly, in Second Embodiment, the minor recesses 9, which are located much closer to the vicinity of the electrode terminal 12 than are the recesses 8, hold or accommodate therein the adhesive agent 3 that has overflown from out of the clearance 7 to the top face 23 of the holder 2 (i.e., one of the opposite faces thereof) and has then further overflown even from out of the recesses 8. Consequently, Second Embodiment can hold or accommodate the overflown adhesive agent 3 more reliably therein. As a result, Second Embodiment can reduce more effectively an amount of the adhesive agent 3 that might potentially arrive even up to and around the electrode terminal 12.

Moreover, the battery adhesion-fixation structure "B" directed to Second Embodiment has a larger accommodation volume for the adhesive agent 3 than does the battery adhesion-fixation structure "A" directed to First battery adhesion-fixation structure "A." That is, Second Embodiment comprises the recesses 8 and minor recesses 9 that can hold or accommodate the adhesion agent 3 therein in a much greater amount. Therefore, such a fear has dissolved as the adhesive agent 3 reaches even up to the electrode terminal 12 located in the central area 14 of the electrode face 11. To put it differently, Second Embodiment can further reduce an amount of the adhesive agent 3 that tries to overflow even up to the vicinity of the electrode terminal 12. Hence, Second Embodiment can inhibit faulty joining from occurring between the electrode terminal 12 and the terminal tab 42 projecting into the bus-bar hole 41. As a result, Second Embodiment enables a battery adhesion-fixation structure with much better adhesive properties to materialize.

In addition, as illustrated FIGS. 7 through 9, Second Embodiment comprises the bus-bar module 6 including the minor through bores 91 that lead to and from the minor recesses 9. Note that the minor through bores 91 function in the same manner as the through bores 81 do.

Third Embodiment

A battery adhesion-fixation structure "C" directed to Third Embodiment according to the present invention differs from First Embodiment in that the insulator 5, which makes up the bus-bar module 6, elongates into the bus-bar-module holes 61. Other than the insulator 5, Third Embodiment is roughly identical with First Embodiment. Descriptions will be hereinafter made on the constituent element that is different from that in First Embodiment while referring to FIGS. 10 through 12.

Figure 10:
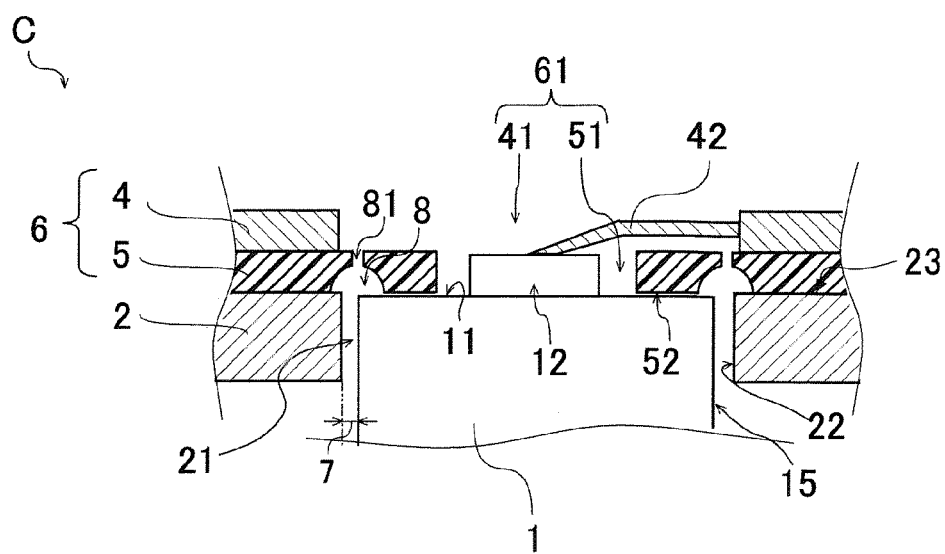
FIG. 10 is an explanatory diagram for schematically illustrating a cross section in a battery adhesion-fixation structure "C" directed to Third Embodiment according to the present invention, and shows a condition where it is free of any adhesive agent.
Figure 11:
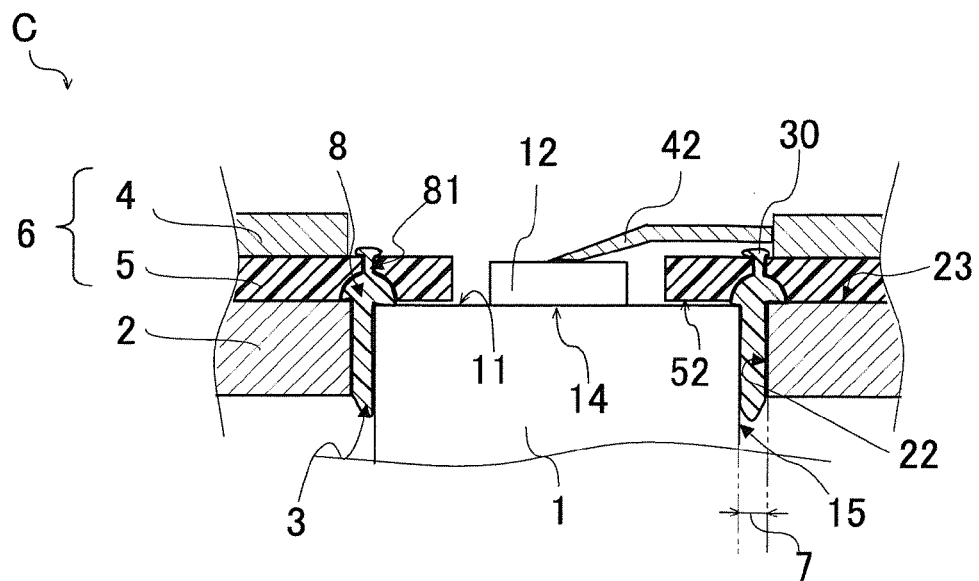
FIG. 11 is another explanatory diagram for schematically illustrating the cross section in the present battery adhesion-fixation structure "C" directed to Third Embodiment.
Figure 12:
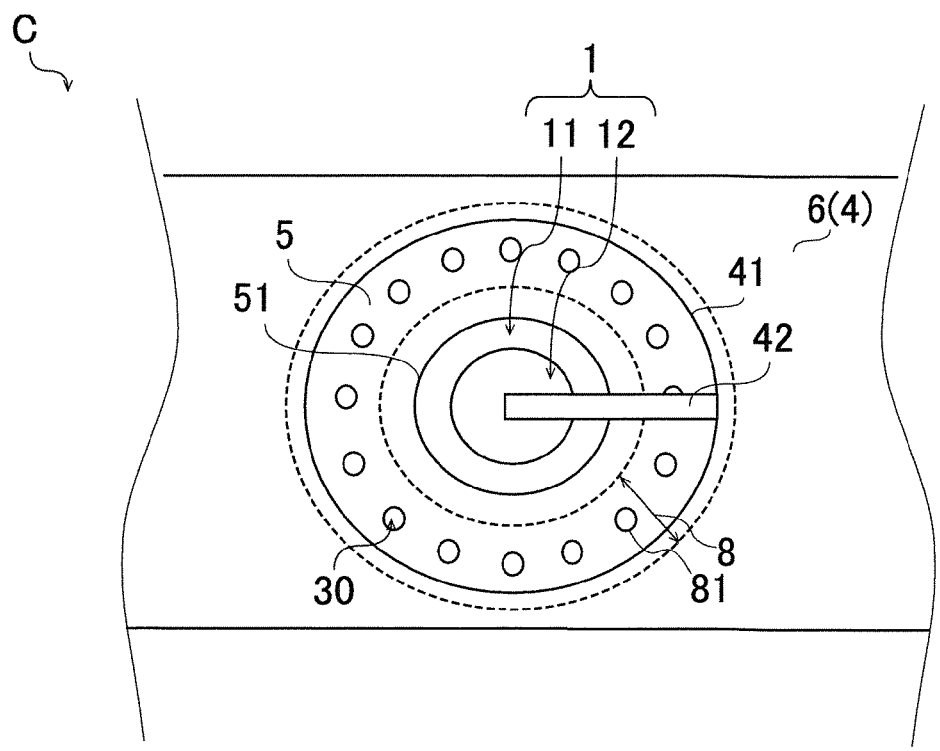
FIG. 12 illustrates a plan view of the present battery adhesion-fixation structure "C" directed to Third Embodiment.
Figure 13:
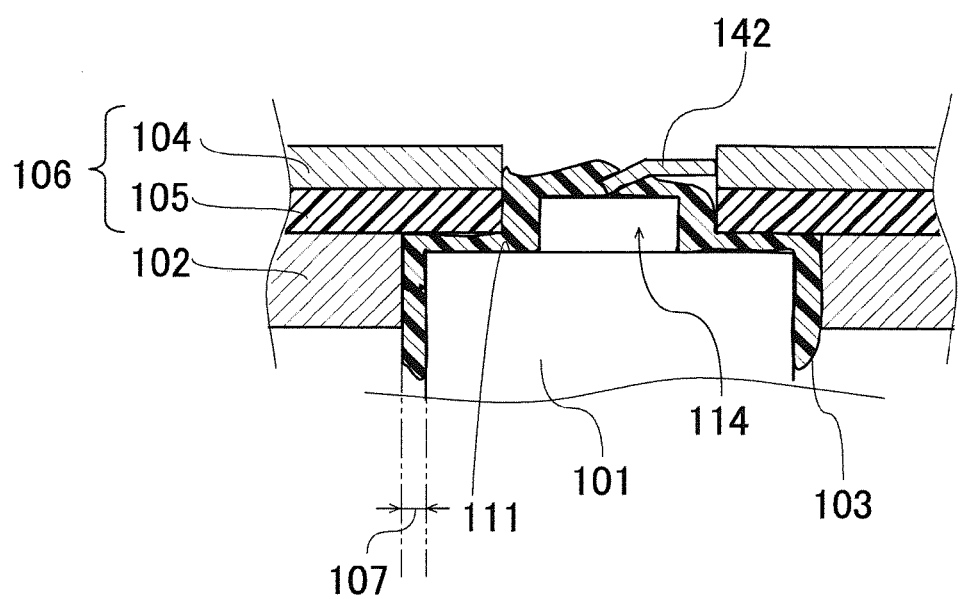
FIG. 13 is an explanatory diagram for schematically illustrating a cross section in a conventional battery adhesion-fixation structure.

As illustrated in FIGS. 10 through 12, in the battery adhesion-fixation structure "C" directed to Third Embodiment, the bus-bar holes 41, which are formed in the bus bars 4, and the insulator holes 51, which are formed in the insulator 5, have hole diameters that differ one another in the size. To be concrete, the insulator holes 51 have a smaller hole diameter than a hole diameter that the bus-bar holes 41 have. Thus, the insulator 5 is configured to have a shape elongating into the bus-bar-module holes 61, like a flange.

Third Embodiment comprises the recesses 8 and through bores 81 that are set up in the insulator 5 elongating into bus-bar-module holes 61. It is needless to say that the thus disposed recesses 8 and through bores 81 according to Third Embodiment effect advantages in the same manner as those according to First Embodiment do.

As illustrated in FIGS. 10 through 12, Third Embodiment comprises the bus bars 4 which are not provided with any recesses 8 and through bores 81.

So far, some of the battery adhesion-fixation structures directed to embodiments according to the present invention have been described. However, battery adhesion-fixation structures directed to the present invention are not at all restricted to the above-described First, Second and Third Embodiments.

For example, as far as the holder holes 21 in the holder 2 can satisfactorily be capable of retaining or holding the battery cells 1 by the portions in the vicinity of the electrode terminal 12 at least, the holder holes 21 are not restricted at all in the configuration.

Moreover, as to the quality of material for the holder 2, metallic materials have been exemplified. However, the holder 2 can satisfactorily be made of a resinous material, such as polypropylene or elastomer, or a nonconductive material, such as ceramic, for instance.

In addition, the exemplified insulator 5 making up the bus-bar module 6 is an insulator that is set up so as to intervene between the bus bars 4 and the holder 2. However, it is good enough that the insulator 5 can cover the entire face of the bus bars 4 except for the terminal tabs 42. If such is the case, it is preferable that the insulator 5 can be formed with a mold while using the bus bars 4 as insert members. Employing such an insert molding process results in positioning the recesses 8 highly accurately, and further leads to enabling the positioning to be carried out with ease. Moreover, the insert molding process makes it possible to form a configuration of the recesses 8 with much higher accuracy, and more easily.

Moreover, as far as the recesses 8 have a cross-sectional configuration being capable of holding or accommodating the adhesive agent 3 therein, the cross-sectional configuration is not restricted at all especially. For example, the recesses 8 can also have such a cross-sectional configuration as a semicircular shape or a rectangular shape. In addition, the exemplified recesses 8 have such a configuration as a ring shape when being viewed from a side of the holder-opposing face 52. However, the recesses 8 are not restricted at all to have such a configuration, but can satisfactorily have any other configurations. Moreover, the minor recesses 9 are not restricted at all especially, either, in terms of the configuration, in the same manner as no restrictions are made on the recesses 8.

In addition, the recesses 8 can satisfactorily be opened toward one of the opposite faces of the holder 2 (e.g., the top face 23 thereof as described above in First, Second and Third Embodiments). In other words, at least some part of the opening of the recesses 8 can satisfactorily be present on a more diametrically outer side than is the holder-hole inner peripheral face 22. The thus set-up recesses 8 can hold or accommodate therein the adhesive agent 3 that has overflown from out of the clearance 7 up to the top face 23 of the holder 2. Moreover, with the recesses 8, the bulky adhesive agent 3, which has overflown up to the top face 23 of the holder 2, is little crushed down to flatten or spread out by the holder-opposing face 52. As a result, the adhesive agent 3 hardly reaches the electrode terminal 12 located or situated in the central area 14 of the electrode face 11 of the battery cells 1.

Moreover, the recesses 8 can satisfactorily be set up in the insulator 5 at least, or can also be set up to extend from the insulator 5 to the bus bars 4. In addition, the through bores 81 can preferably be set up along with the recesses 8, but the battery adhesion-fixation structure according to the present invention can even be free of the through bores 81. Moreover, the configuration of the bus bars 4, and a quantity of the battery cells 1 with which the bus bars 4 are connected are not restricted at all especially. In addition, the insulator 5 can even be formed integrally with the holder 2. Moreover, when a battery adhesion-fixation structure as shown in FIGS. 1 and 2 further comprises another holder and insulator at the lower end of the battery cells 1, for instance, it is preferable to provide the other insulator, which covers the lower bus bars 4, with recesses like the recesses 8 according to the above-described embodiments.

What is claimed is:

1. A battery adhesion-fixation structure comprising:
    a plurality of battery cells;
    a holder including a plurality of holder holes for holding the battery cells therein;
    an adhesive agent adhering the battery cells to the holder within the holder holes;
    a plurality of bus bars electrically connecting the battery cells with each other;
    an insulator intervening between the bus bars and the holder;
    the bus bars including a bus-bar hole facing an electrode terminal of the battery cells and a terminal tab projecting into the bus-bar hole, the terminal tab to be electrically connected with the electrode terminal;
    the insulator including a face opposing the holder and a dent opening in the face of the insulator opposing the holder; and
    the dent accommodating the adhesive agent overflown toward the insulator therein, wherein
    the bus bars and the insulator are integrated to make up a bus-bar module,
    the bus-bar module includes a through bore that is located on an outer surface of the bus-bar module and that leads from the outer surface of the bus-bar module to the dent of the insulator, and
    the adhesive agent extends through the dent of the insulator and the through bore of the bus-bar module to form a head that is located on the outer surface of the bus-bar module to anchor the bus-bar module and a corresponding battery of the plurality of battery cells to the holder.

2. The battery adhesion-fixation structure according to claim 1, wherein:
    the insulator further includes a sub-dent disposed more adjacently to a side of the electrode terminal of the battery cells than is the dent disposed, and opened toward one of the holder holes; and
    the sub-dent communicates with the dent.

3. The battery adhesion-fixation structure according to claim 1, the bus-bar module includes the bus bars free of the dent.

4. The battery adhesion-fixation structure according to claim 1, wherein the insulator further includes a through bore leading to and from the dent coaxially.

5. The battery adhesion-fixation structure according to claim 4, wherein the through bore communicates with an exterior of the battery adhesion-fixation structure.

6. The battery adhesion-fixation structure according to claim 5, wherein the adhesion agent spreads out from the dent to the exterior by way of the through bore to make a head.

7. The battery adhesion-fixation structure according to claim 1, wherein the dent of the insulator is partially present over the holder, and is partially present over the holder holes.

8. The battery adhesion-fixation structure according to claim 7, wherein the insulator further includes a through bore leading to and from the dent coaxially.

9. The battery adhesion-fixation structure according to claim 8, wherein the through bore communicates with an exterior of the battery adhesion-fixation structure.

10. The battery adhesion-fixation structure according to claim 1, wherein the insulator elongates radially inward into the holder holes of the holder to make a flange provided with the dent, thereby making the bus bars free of the dent.

* * * * *